March 10, 1970  V. F. FOSTER  3,500,150
TOOL RADIUS OFFSET CONTROL FOR A CLOSED LOOP MULTIAXES
NUMERICAL CONTROL SYSTEM
Filed Oct. 24, 1965  4 Sheets-Sheet 1

CLOCKWISE MOTION
OUTSIDE CUTS

COUNTER-CLOCKWISE MOTION
INSIDE CUTS

INVENTOR.
VINCENT F. FOSTER
BY
W. E. Beatty
ATTORNEY

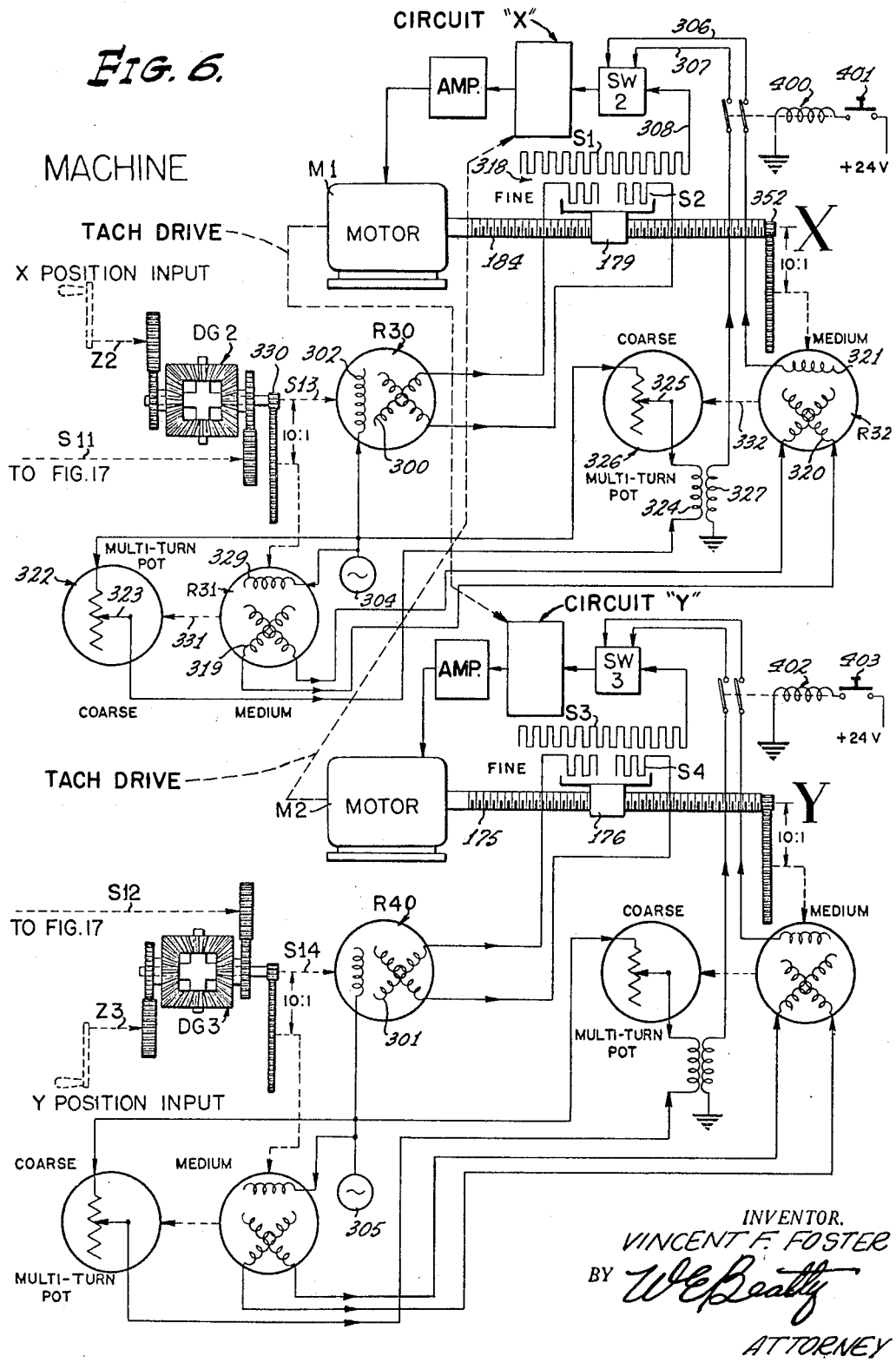

ated Mar. 10, 1970

United States Patent Office 3,500,150
Patented Mar. 10, 1970

3,500,150
TOOL RADIUS OFFSET CONTROL FOR A CLOSED LOOP MULTIAXES NUMERICAL CONTROL SYSTEM
Vincent F. Foster, New Rochelle, N.Y., assignor to Inductosyn Corporation, Carson City, Nev., a corporation of Nevada
Filed Oct. 24, 1965, Ser. No. 504,512
Int. Cl. H02p *1/54, 5/46;* G05b *23/02*
U.S. Cl. 318—18                                       7 Claims

ABSTRACT OF THE DISCLOSURE

A tool radius offset control for a machine tool system wherein separate command signals are provided for each of two axes for directing a tool according to a program. For each axis, a device such as a tachometer or transformer supplies a tool radius offset signal which is a function of the component of velocity of the tool in the other axis. The offset signal is combined algebraically with the command signal for the corresponding axis. When the tool is moving at constnt velocity, the control offsets the tool path perpendicular to the programmed path by an amount equal to the difference in radii of the tool actually used and the tool programmed for use. Further, the control provides gradual cutter offset as the tool is started or stopped.

---

The invention relates to tool radius offset control and is useful for correcting the tool radius as programmed on a tape in a contour machine.

This invention utilizes the principle that the speed components of the tool along each axis (X and Y) are trigonometric functions of the direction of the pool path. If the assumption is made that the tool path (that is the resultant of X and Y) is essentially at a constant speed, then an extremely simple tool radius correction device results.

The disadvantage of assuming that the tool path is at a constant speed is evident. However, where precision is required, particularly on finished cuts, the programmer could provide in his program that the tool path always be at a constant speed. For roughing cuts, the errors due to non-constant speed would not be a problem, inasmuch as the roughing cut need not be accurate. For places where the tool might be required to dwell, such as for boring holes, tool radius correction would not be required in any event. A large number of contouring operations are performed at constant tool speed and the procedure of the present invention applies only to those cases for precision cuts. In other operations where precision cuts are not required, or when stopping and starting, the device of the present invention is still operative but less precise.

The present invention has certain advantages.

In previous systems, wherein tool radius compensation is applied to an existing machine tool system, the correction itself is usually a fixed offset normal to the tool path. Since this fixed offset does not exist on the tape or in the control console, as a rule, but rather is an added correction from an external source, there is usually a severe limitation at starting from a stopped position, stopping, and negotiating sharp corners, negotiating sharp corners being a special form of starting and stopping.

Since this offset is a fixed amount for each intended direction of cut, it is usual to observe an infinite acceleration when starting from a stopped position. This is contrary to the desirable smooth way all other motions are controlled. When the full compensation is put in or taken out instantaneously, the machine tool will be called upon to move so swiftly as to possibly damage the tool or the work.

An object of this inevntion is to provide means whereby this undesirable feature is overcome. As can be seen, the compensation is inserted in proportion to the speed of the machine and, therefore, follows smoothly the programmed acceleration. Thus, when accelerating from a stopped position, the offset is smoothly changed from zero to its correct amplitude or from its correct amplitude to zero.

This invention uses the already existing speed parameters of a contouring system to insert a positional correcting factor into the control voltages. It converts *speed to distance*. Another feature of this invention is that it uses a parameter of one axis to correct or change the position in *another* axis. The invention provides a cross connection of the speed analog of one axis into the distance control signals of the *other* axis.

For further details of the invention reference may be made to the drawings wherein.

FIG. 6 is a reproduction of FIG. 18 of U.S. Pat. No. 2,875,390, with additions in broken lines including blocks represented by circuits X and Y, corresponding to the blocks similarly identified in FIGS. 4 and 5.

Figure 1:
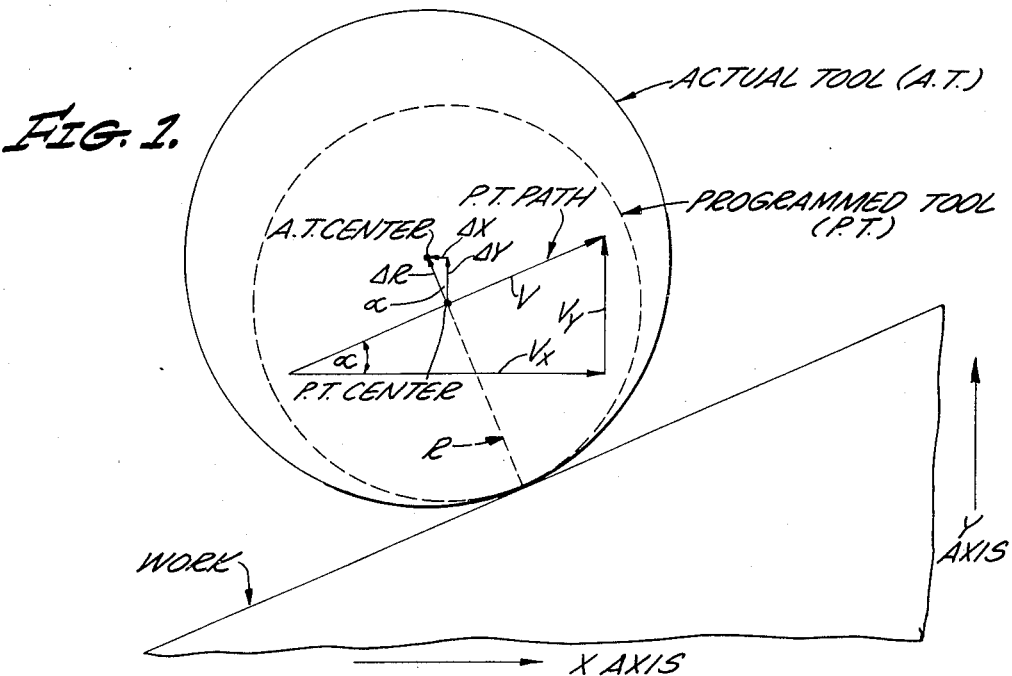
FIG. 1 is a schematic view useful for explaining the trigonometric derivation of the correction vectors.
Figure 2:
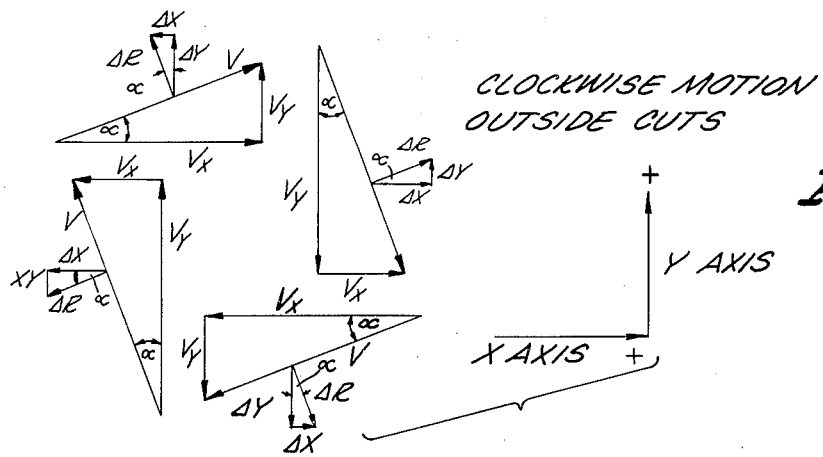
FIG. 2 is a schematic view showing how this derivation is true for clockwise motion, outside cuts.
Figure 3:
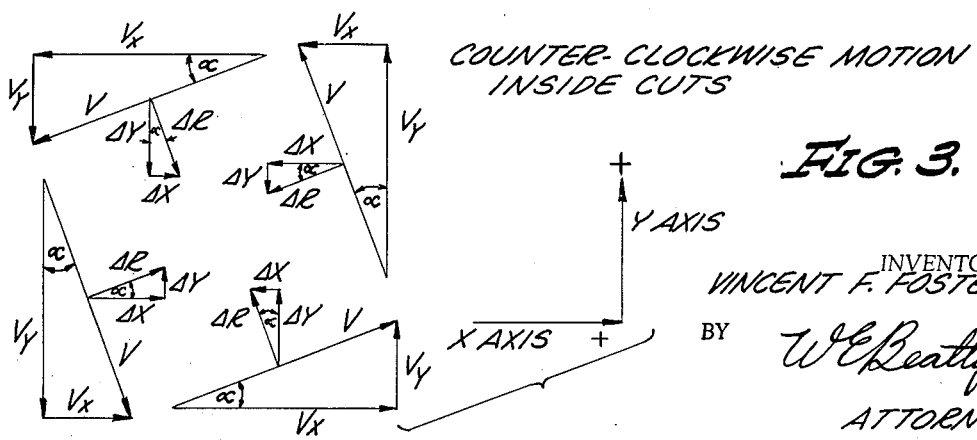
FIG. 3 is a schematic view showing how this derivation is true for counter clockwise motion, inside cuts.

Referring in detail to FIGS. 1, 2 and 3 of the drawings, the following is a list of the symbols used, with their definitions.

A.T.=actual tool
P.T.=programmed tool
C.W.=clockwise
C.C.W.=counter clockwise
V=speed of programmed tool along P.T. path
$V_x$=speed vector of P.T. along X axis
$V_y$=speed vector of P.T. along Y axis
R=radius of tool (P.T.) as programmed on control tape
$\Delta R$=radius correction required for actual tool size (A.T.)
$\Delta X$ and $\Delta Y$=correction vector along X and Y axes
R and $\Delta R$=actual tool (A.T.) radius
$\alpha$=angle of cut From FIG. 1, triangle $V_x$, $V_y$, V is similar to triangle $\Delta R$, $\Delta X$, $\Delta Y$. Angles $\alpha$ in both triangles are equal.

$$\Delta X = -\Delta R \sin \alpha = -\Delta R \cdot \frac{V_y}{V} \quad (1)$$

$$\Delta Y = \Delta R \cos \alpha = +\Delta R \cdot \frac{V_x}{V} \quad (2)$$

Inspection of FIG. 2 and FIG. 3 will show that Equations 1 and 2 are correct for all clockwise outside cuts and counterclockwise inside cuts.

For cuts opposite in direction to above, sign must be reversed, since $V_x$ and $V_y$ in all cases are of opposite sign.

Therefore, for counter clockwise outside cuts, and clockwise inside cuts, Equations 3 and 4 apply.

$$\Delta X = +\Delta R \cdot \frac{V_y}{V} \qquad (3)$$

$$\Delta Y = -\Delta R \cdot \frac{V_x}{V} \qquad (4)$$

$\Delta R/V$ is common in all equations, and can be simulated by a voltage ratio tap on a transformer, or a voltage from a tachometer driven by a motor for the respective axis, or other analog control for one axis in accord with the speed of the other axis.

Equations 1 and 3 show that the correction vector along the X axis is proportional to the speed vector $V_y$ of the programmed tool along the Y axis. Equations 2 and 4 show that the correction vector along the Y axis is proportional to the speed vector $V_x$ of the programmed tool along the X axis.

The invention is illustrated in FIG. 6 as applied to the automatic machine control system of U.S. Patent 2,875,390 to R. W. Tripp patented Feb. 24, 1959. More particularly, the invention is illustrated as applied to FIG. 18 of that patent. It is understood that the system is programmed for constant tool speed.

The following is quoted from col. 20, lines 13–25 of the patent.

Referring to FIG. 6, as noted in the '390 patent, the following description appears col. 19, line 73 to col. 20, line 67, added material being shown in parentheses, omitted matter being represented by dots.

"Shaft S11 is an input to the differential gear DG2 in FIG. 18 and shaft S12 is an input to differential gear DG3. (S11 and S12 rotate at speeds proportional to the desired velocities of the X and Y machine elements, respectively, which are driven by nuts 179 and 176.) The other input to each of the differential gears DG2 and DG3 is here shown in each case as a manual input Z2 and Z3 respectively, for zero offset, namely to displace the origin of the tool path. Shaft S13 is an input to the electrical resolver R30 and shaft S14 is an input to the electrical resolver R40.

"Resolver R30 has a single winding 302 rotatable relatively to its quadrature windings 300 and has a repeating cycle of once per revolution, while the fine data element 318, here shown as an Inductosyn, has a large number of poles per inch such as 20, with a repeating cycle of 0.1 inch. Inductosyn 318 has a scale S1 and a slider S2 having quadrature windings in circuit with the windings 300 of resolver R30. The linear X position of the servo motor M1 is controlled by the fine error signal in line 308 from the scale S1, by the medium error signal in line 306 and by the coarse error signal in line 307. The fine error signal in line 308 is always active, while the coarse and medium error signals are available on command by operating switch 401 to operate the relay 400. All three error signals operate at so called different "speeds" or under control of switch SW2." (For further details of a switch like SW2 and a servo circuit which may be used, reference may be made to pages 81 to 88 and elsewhere of the following book; vol. 25, Radiation Laboratory Series, "Theory of Servo-Mechanisms" by James et al., published 1947 by McGraw-Hill Book Co., pages 81–88 define "speed" and disclose a "synchronizing" circuit for dual-speed which may be used here. Also, this book discloses known servo techniques which may be used.)

"The resolver R31 is similar in construction to resolver R30 and it functions as a synchro transmitter, serving as a medium data element and having a single winding 329 and quadrature windings 319. Its quadrature windings 319 supply sine and cosine values, depending upon its angular position, to the quadrature windings 320 of a similar resolver R32 which serves as a synchro receiver. Resolver R32 has a winding 321 which supplies an error signal to the line 306 when relay 400 is active, and depending upon the desired X position established by operation of the handle or input Z2.

"The coarse data element 322, here shown as a potentiometer, has a slider 323 connected to one end of a transformer primary winding 324, while the slider 325 of the coarse data receiver potentiometer 326 is connected to the other end of that winding, whereby the secondary winding 327 supplies to the line 307 an error signal depending upon the discrepancy if any, between the coarse position set up by the input Z2 and the coarse position assumed by the machine element . . . driven by the nut 179.

"A reference source of voltage 304 energizes windings 329 and 302, as well as the potentiometers 322 and 326. Shaft S13 drives resolver R31 through a 10 to 1 gear ratio 330, this drive also operating potentiometer 322 as indicated by shaft 331. The motor shaft 184 drives resolver R32 through a 10 to 1 gear ratio 352, this drive also operating potentiometer 326 as indicated by shaft 332. Suitable gear ratios not shown may be employed in the shafts like 331 and 332, whereby the various mechanical linkages provide scale factors in the ratio of 100 in. to 10 in. to 0.1 in. for the coarse, medium and fine data elements like 322 and 326, R31 and R32, and 318 respectively.

"The 'Y' position control in FIG. 18 is similar to that above described for the 'X' position, corresponding elements being shown.

"After the 'X' and 'Y' positioning has been accomplished by operating the inputs Z2 and Z3 and by closing the switches 401 and 403, these switches are released so that the slope, curvature and rate of change of curvature information in shafts S11 and S12 take command."

As it is assumed that the speed is constant, then $\Delta R$ divided by "V" is also constant throughout the milling operation, as follows from Equations 3 and 4. Theoretical values could also be determined. However, in practice, the operator can select a tap on the transformer or a voltage from the tachometer experimentally and determine whether or not the selection is correct, or should be changed.

Figure 4:
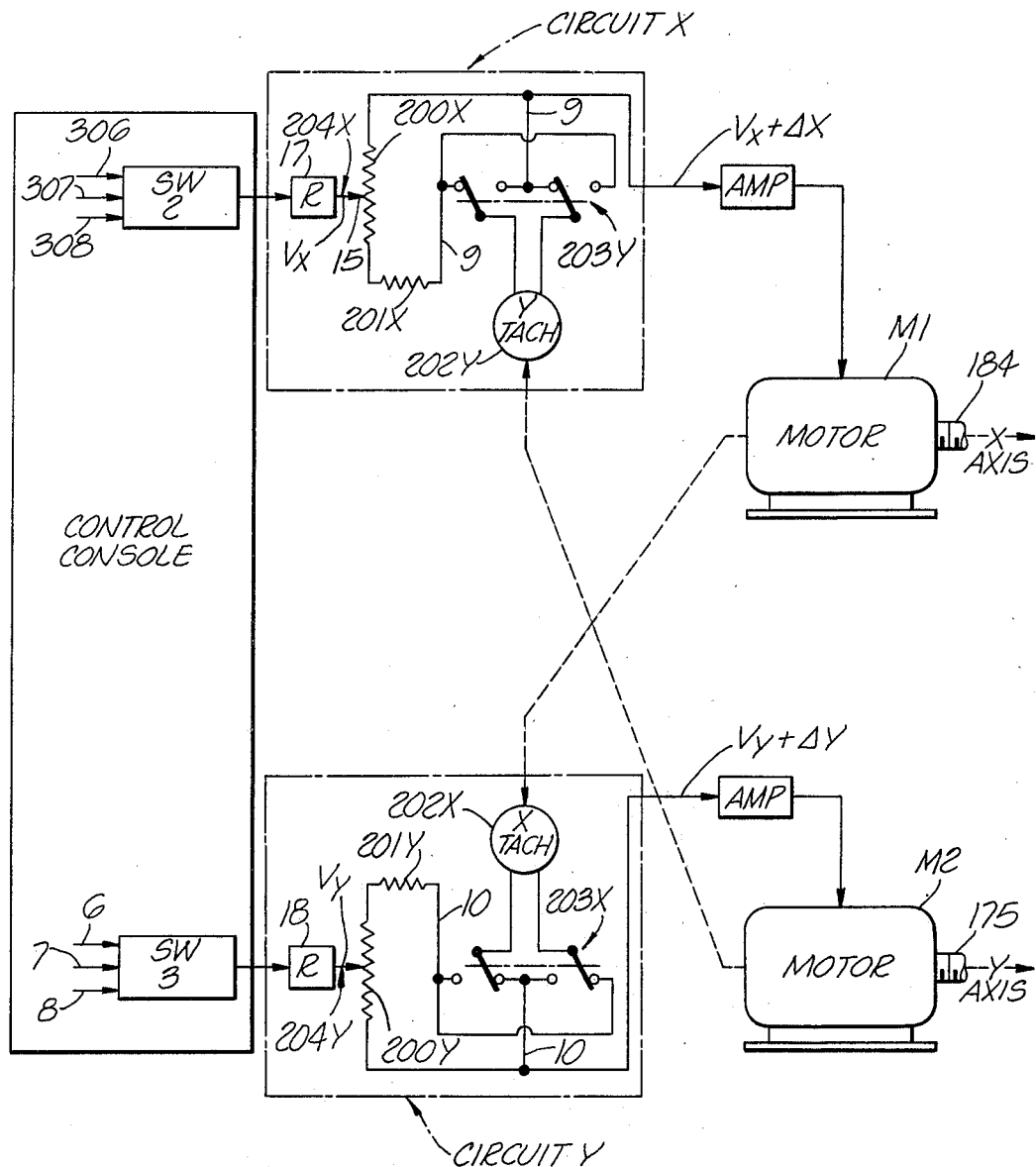
FIG. 4 is a schematic view of circuit and apparatus utilizing tachometers to determine an analog function of the speed of each axis for tool radius offset control for the other axis.
Figure 5:
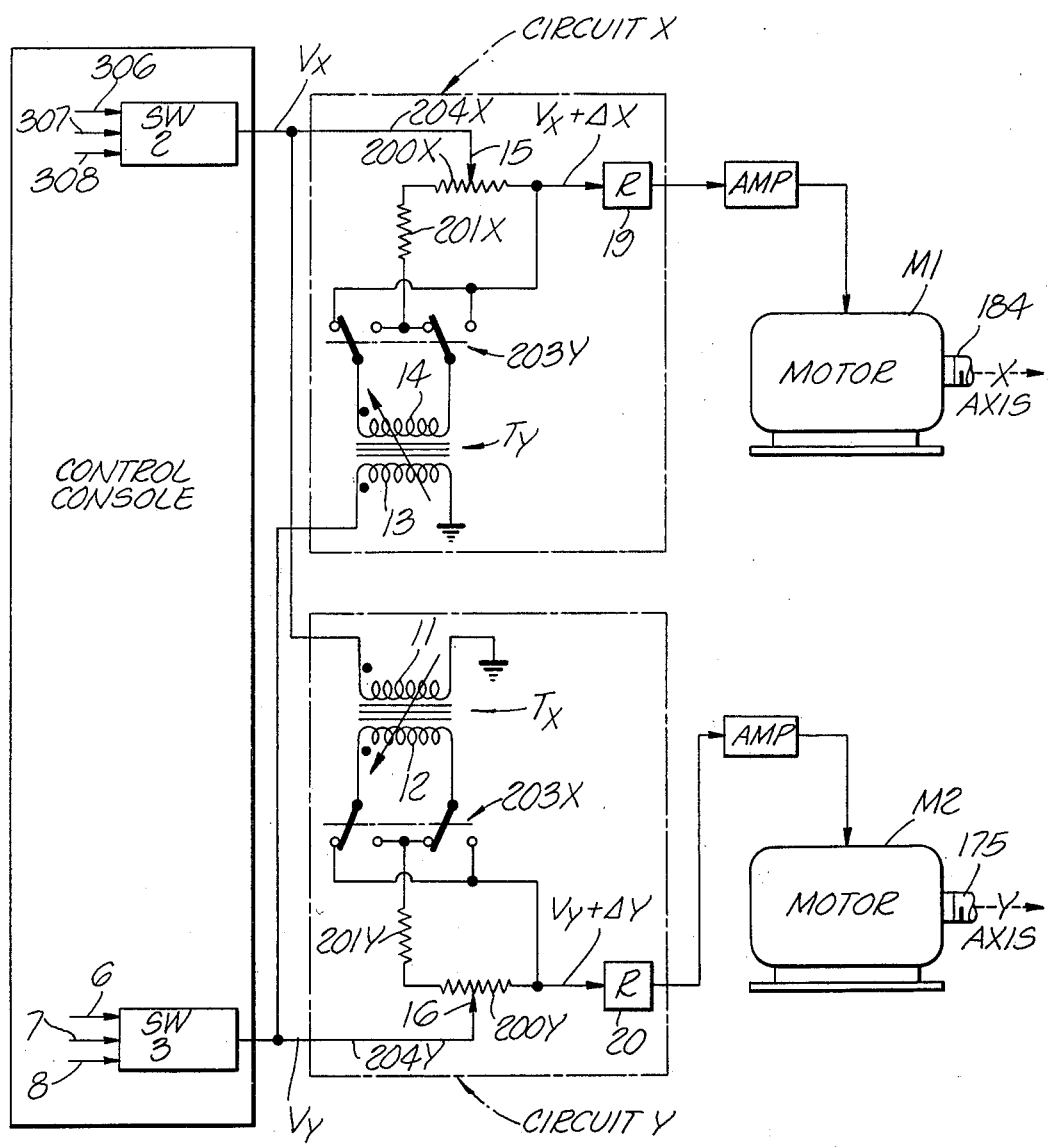
FIG. 5 is a schematic view of amodified circuit using transformers to determine a function of the speed of each axis with an electrical analog for tool radius offset control.

Referring to FIGS. 4 and 5, the following items are duplicated with reference to FIG. 18 of the above patent. Switch SW–2, switch SW–3, amplifier AMP, motor M1, motor M2, shaft 184, shaft 175, and lines 306, 307, 308. Lines corresponding to 306, 307 and 308 in the patent and as appears in FIGS. 4 and 5 herein are shown at 6, 7 and 8 respectively, as inputs for axis Y to the switch SW–3. The connection between SW–2 and AMP, shown on FIG. 18 of the patent, is labeled 204X in FIGS. 4 and 5, the corresponding line for axis Y being labeled 204Y. According to the present invention, the variable potentiometer 200X is inserted in the line 204X with an adjustable tap 15, as shown. Potentiometer 200X is fed via line 9 in FIG. 4 from a reversing switch 203Y which is in the output of a DC tachometer 202Y driven by motor M2 for the Y axis. Inserted in series in the line 9 is the trimming resistance 201X to reduce cross coupling and adjust the value of the signal applied to the potentiometer 200X. Similarly for the other axis, the tachometer 202X has an output having a reversing switch 203X which is connected by line 10 in series with the variable potentiometer 200Y which has an input from the line 204Y and adjustable tap 16. In series in the line 10 is a trimming resistance 201Y similar to 201X. As indicated adjacent AMP for axis X in FIG. 4, the signal input to this amplifier is $V_x + \Delta X$, where $V_x$ is the error signal in the output of the switch SW–2, and where $\Delta X$ is the increment which is derived from the tachometer 202Y for the other axis to provide a signal which varies in accordance with the speed of the motor M2 for the Y axis, in accordance with the present invention.

Similarly, adjacent AMP for the Y axis, appears the equation $V_y + \Delta Y$ which represents the total signal input to that amplifier and the motor M2, and wherein $V_y$ represents the error signal in the line 204Y at the output of switch SW–3, and wherein $\Delta Y$ represents the increment derived from the tachometer 202X for the axis X. It is apparent, therefore, that the control signal, as applied to the motor for the respective axis depends upon the speed of the motor for the other axis, in accordance with the present invention.

In the modification, shown in FIG. 5, the transformers Tx and Ty are used instead of the tachometers in FIG. 4. Transformer Tx has a primary winding 11 having one terminal connected to the line 204X and the other terminal connected to ground, as indicated. This transformer has a secondary winding 12, which is connected to the reversing switch 203X. Transformer Ty has primary and secondary windings 13 and 14 which are connected in a manner similar to that described above.

In both FIGS. 4 and 5, the output from switch SW–2 and SW–3 is AC. Tachometers 202X and 202Y are assumed to have a DC output. Therefore, in FIG. 4, the line 204X is provided with a demodulator R, indicated at 17 and the line 204Y has a similar demodulator R, indicated at 18, whereby the input to the amplifier AMP is DC for both axes.

In FIG. 5, the AC signal in lines 204X and 204Y is suitable for input to the transformer windings 11 and 13, as shown. Each transformer may have 10 taps. In order that the amplifier AMP for each axis be supplied with a DC signal, ahead of each amplifier is employed a demodulator R, as indicated at 19 and 30 in FIG. 5.

The heavy dots in FIG. 5 for the transformers Tx and Ty indicate the sign of the phase of the signals.

A correction for tool radius is applicable in cases where the tool is larger, or smaller, than the value called for by the program and that is one purpose of the reversing switches 203X, 203Y.

Another purpose of the reversing switches is to change the directional commands for this correction for the cases of clockwise or counter-clockwise programming, or inside or outside cuts.

I claim:

1. Cutter radius offset control for a machine tool system wherein separate command electrical signals are provided for each of two axes for directing a tool according to a program, said control comprising separate control means for supplying for each axis a tool radius offset electrical signal in response to and as a function of the actual velocity of the tool in the other axis, and separate means for algebraically combining the command signal and the corresponding tool radius offset signal for each axis.

2. Cutter radius offset control according to claim 1, said control means being operative to offset the path of the tool a fixed amount perpendicularly from the program path.

3. Cutter radius offset control according to claim 1, wherein said control means comprises a tachometer for each axis for supplying a voltage bias controlling the command signal for the other axis.

4. Cutter radius offset control according to claim 1, comprising separate switching means for reversing the sign of the tool radius offset signal for each axis.

5. Cutter radius offset control according to claim 1, said control for each axis being operative to reduce the tool offset to zero when the tool is in stopped position.

6. Cutter radius offset control according to claim 2, each of said control means comprising a tachometer sensing the component of velocity for one axis, the output of said tachometer comprising the tool radius offset signal for the other axis.

7. Cutter radius offset control according to claim 2 further comprising potentiometer means for adjusting the relative magnitude of the offset and command signals for said each axis, said relative magnitude determining said fixed amount of offset.

References Cited

UNITED STATES PATENTS 3,109,974    11/1963    Hallmark.
3,270,186    8/1966    Centner.

THOMAS E. LYNCH, Primary Examiner

U.S. Cl. X.R.

235—151.11; 318—162